United States Patent [19]

Cuker

[11] 3,878,437

[45] Apr. 15, 1975

[54] POWER OUTPUT CIRCUIT FOR ELECTRICAL DISCHARGE MACHINING APPARATUS

[76] Inventor: Seymour Cuker, 18955 Birchcrest, Detroit, Mich. 48221

[22] Filed: Mar. 28, 1973

[21] Appl. No.: 345,483

[52] U.S. Cl. .......... 317/33 VR; 317/33 SC; 317/31; 219/69 S

[51] Int. Cl. .......................... H02h 3/20; H02h 7/22

[58] Field of Search ..... 219/69 C, 69 S, 69 P, 69 G; 317/33 VR; 330/16, 18, 20, 22

[56] References Cited

UNITED STATES PATENTS

| | | | |
|---|---|---|---|
| 3,538,303 | 11/1970 | Percival | 323/25 |
| 3,636,381 | 1/1972 | Press | 307/296 |

*Primary Examiner*—J. D. Miller
*Assistant Examiner*—Patrick R. Salce
*Attorney, Agent, or Firm*—Arnold S. Weintraub

[57] ABSTRACT

An improved power output pulse amp circuit module for use especially in an apparatus for machining a conductive workpiece by passing electrical pulses between a tool electrode and the workpiece across an arc gap therebetween. The improved power output circuit module includes individual diodes in series with each output transistor to prevent sequential massive failure and also to protect each individual transistor against the second breakdown phenomenon. Optionally, the output circuit module may include a protector circuit for detecting the presence of a high voltage due to a breakdown, which protector circuit may be used to turn OFF the high voltage supply and also, optionally to turn ON an operator warning light until a repair or replacement has been made.

3 Claims, 1 Drawing Figure

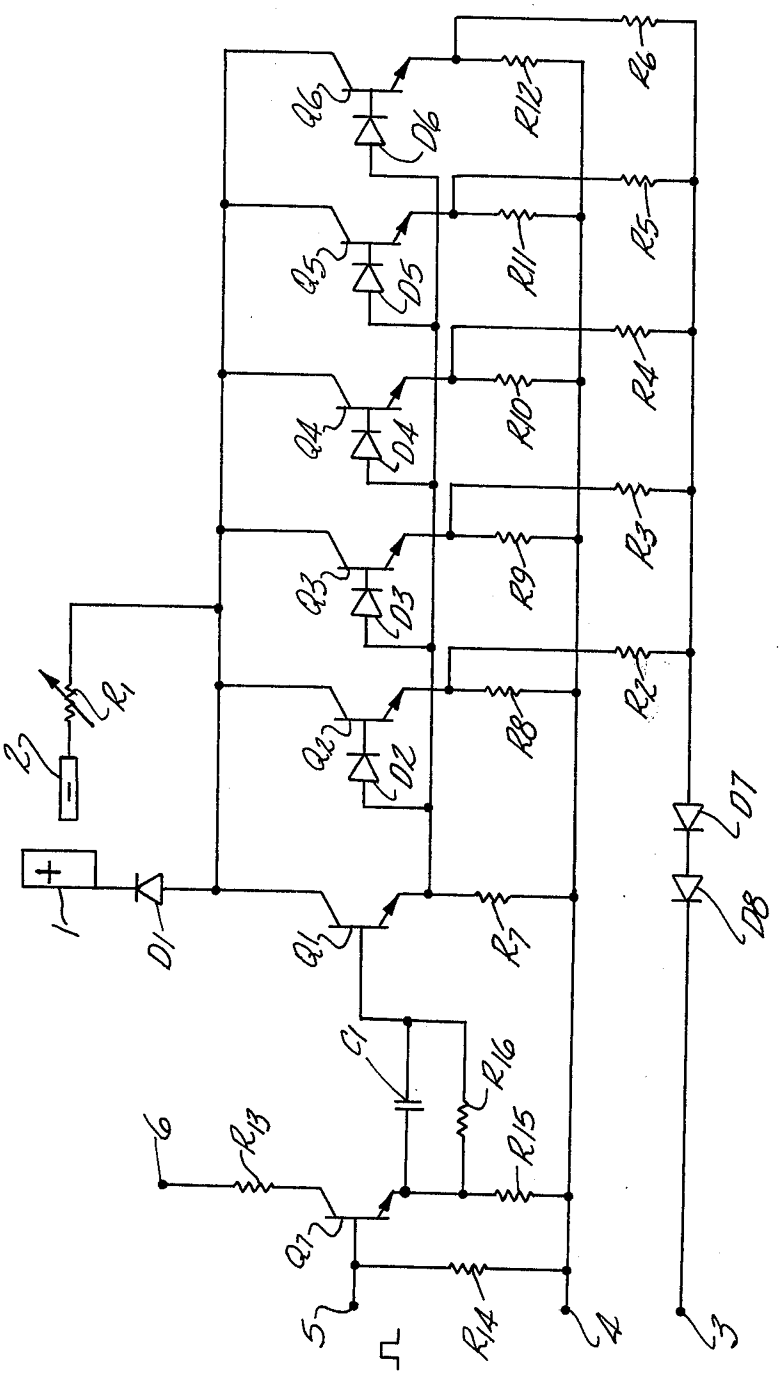
Q1
Q2
Q3
Q4
Q5
Q6
Q7
D1
D2
D3
D4
D5
D6
D7
D8
R1
R2
R3
R4
R5
R6
R7
R8
R9
R10
R11
R12
R13
R14
R15
R16
C1
1
2
3
4
5
6

POWER OUTPUT CIRCUIT FOR ELECTRICAL DISCHARGE MACHINING APPARATUS

The present invention relates to an improved power output pulse amp circuit module, especially useful in an apparatus for machining a conductive workpiece by passing electrical pulses between a tool electrode and the workpiece across an arc gap therebetween.

BACKGROUND OF THE INVENTION

The present invention relates to the field known as electrical discharge machining in which material is removed from an electrically conductive workpiece by the action of electrical gap discharges between one or more tool electrodes and the workpiece. The output circuit which provides the electrical gap discharges between the tool electrode and the workpiece may contain one or more electronic control devices.

The term "electronic control device" as used herein is intended to mean any electronic switching device having three or more electrodes comprising at least two principal power electrodes acting to control current flow in the power circuit, the conductivity between the power electrodes being controlled by a control electrode within the device whereby the conductivity of the power circuit is controlled statically or electrically without the movement of mechanical elements within the device. Included within this definition are vacuum tubes, transistors, and other solid-state devices in which the turn-ON is accomplished by a control voltage applied to the control electrode, and in which the turn-OFF is accomplished automatically in response to the removal or decrease of that control voltage.

If for some reason there occurs in the aforementioned output circuit a failure of one of the electronic control devices, this condition is invariably followed in the prior art devices by a massive failure of the remaining electronic control devices and/or second breakdown in the individual electronic control devices. The present invention solves this problem.

SUMMARY OF THE INVENTION

The present invention provides a power output circuit for use in conjunction with an apparatus for machining a conductive workpiece by passing electrical pulses between a tool electrode and the workpiece across an arc gap therebetween. The apparatus includes a power supply and a pulse generator. The output circuit includes a first electronic control device having first, second and third electrodes, and a plurality of second electronic control devices each having first, second and third electrodes. The first electrodes of the first and second electronic control devices are electrically connected together. A first unidirectional electrical device is electrically connected between the conductive workpiece and the first electrodes of the first and second electronic control devices. A first resistive network is electrically connected between the tool electrode and the first electrodes of the first and second electronic control devices. The pulse generator has first and second output terminals which are electrically connected to the second and third electrodes, respectively, of the first electronic control device. The third electrodes of the plurality of second electronic control devices are electrically connected to the second output terminal of the pulse generator. The output circuit also includes a plurality of second unidirectional electrical devices each of which is electrically connected to and is associated with a respective one of the second electronic control devices in such a manner that the second unidirectional electrical device is electrically connected between the second electrode of its associated second electronic control device and the third electrode of the first electronic control device.

The present invention provides an output circuit for an electrical discharge machining apparatus wherein individual diodes are connected in series with each output transistor base to prevent massive failure, and to protect each individual transistor in the output circuit against second breakdown.

The present invention also provides an output circuit for use in conjunction with an electrical discharge machining apparatus, wherein the presence of a high voltage due to a breakdown is detected at a protector circuit terminal for use in turning OFF the high voltage supply and to turn ON an operator warning light, if desired, until repair or replacement transpires.

The present invention also provides an output circuit wherein the magnitude of the collector current begins to become limited as the drive is increased to the output power transistors.

The present invention also provides a power output circuit wherein all failures due to second breakdown are eliminated.

BRIEF DESCRIPTION OF THE DRAWING

The drawing illustrates a schematic of a power output circuit in accordance with the principles of the present invention used in conjunction with an electrical discharge machining apparatus.

DETAILED DESCRIPTION OF THE INVENTION

With reference to the drawing, there is illustrated a conductive workpiece 1 and a tool electrode 2 which forms an arc gap therebetween. In the drawing, the conductive workpiece 1 is indicated as being at a positive potential, whereas the tool electrode 2 is indicated as being at a negative potential.

The output circuit also includes a first electronic control device or power output NPN junction transistor Q1 having a first or collector electrode, a second or base electrode, and a third or emitter electrode. A first unidirectional electrical device, such as diode D1, is connected between the conductor workpiece 1 and the transistor Q1, the diode D1 having its cathode connected to conductor workpiece 1 and its anode connected to the collector electrode of transistor Q1.

A first resistive network, such as variable resistor R1, is electrically connected between the tool electrode 2 and the collector of transistor Q1.

There is also provided a plurality of second electronic control devices or NPN junction transistors Q2, Q3, Q4, Q5 and Q6. Each of the second electronic control devices is provided with a first or collector electrode, a second or base electrode, and a third or emitter electrode.

There is provided a plurality of second unidirectional electrical devices such as diodes D2, D3, D4, D5 and D6. Diode D2 has its cathode connected to the base of transistor Q2 and its anode connected to the emitter of transistor Q1. Diode D3 has its cathode connected to the base of transistor Q3 and its anode connected to the emitter of transistor Q1. Diode D4 has its cathode connected to the base of transistor Q4 and its anode connected to the emitter of transistor Q1. Diode D5 has its cathode connected to the base of transistor Q5 and its anode connected to the emitter of transistor Q1. Diode D6 has its cathode connected to the base of transistor Q6 and its anode connected to the emitter of transistor Q1. It should also be noted that in the embodiment illustrated in the drawing, the collector electrodes of transistors Q1–Q6 are connected to the anode of diode D1 and to one terminal of the variable resistor R1. The diode D1 is used herein for a "damping" effect. The diode D1 damps the overshoot due to the energy exchange between the circuit imductance and circuit capacitance, i.e., the diode D1 damps the overshoot due to the circuit inductance capacitance. Without diode D1, a maximum overshoot would be about twice the applied supply or B voltage. A maximum overshoot of this magnitude could result in transistor voltage breakdown failure.

The embodiment illustrated in the drawing shows a protector circuit, which is an optional feature of the present invention, electrically connected between the emitter electrodes of transistors Q2–Q6 and a power supply (not shown) for detecting a malfunction or failure of any one of transistors Q2–Q6. The protector circuit includes a plurality of first resistive elements or resistors R2, R3, R4, R5 and R6, which are each electrically connected between the respective emitter electrode of transistors Q2–Q6 and a third unidirectional electrical device. The third unidirectional electrical device may be, for example, a single diode, but such device is illustrated in the drawing as a pair of series connected diodes D7 and D8. The cathode of diode D8 is connected to terminal 3, which in turn is connected to first means (not shown) for automatically terminating the supply of high voltage to all of the transistors shown in the drawing when at least one of the transistors Q2–Q6 has malfunctioned or failed. Terminal 3 may, for example, be connected to first means which might take the form of a control relay and an operator warning light.

The electrical discharge machining apparatus may be provided with a conventional pulse generator (not shown) having output terminals 4 and 5. The drawing illustrates an idealized square wave pulse which is supplied to output terminals 4 and 5 from the output of the pulse generator, or the buffer output of such a pulse generator. A second resistive element or resistor R7 is connected between the emitter electrode of transistor Q1 and output terminal 4 of the pulse generator. A plurality of third resistive elements or resistors R8, R9, R10, R11 and R12, are each electrically connected between output terminal 4 of the pulse generator a respective emitter electrode of transistors Q2–Q6.

In the drawing there is illustrated a pre-driver circuit electrically connected between the power output transistor Q1 and the output terminals 4 and 5 of the pulse generator. The pre-driver circuit includes a third electronic control device or pre-driver NPN junction transistor Q7 having a first or collector electrode, a second or base electrode, and a third or emitter electrode.

A fourth resistive element or resistor R13 is electrically connected between the collector of pre-driver transistor Q7 and the positive terminal 6 of a source of electrical energy (not shown) which may, for example, be the high voltage supply.

A fifth resistive element or resistor R14 is electrically connected between the base of pre-driver transistor Q7 and output terminal 4 of the pulse generator. A sixth resistive element or resistor R15 is electrically connected between the emitter electrode of pre-driver transistor Q7 and output terminal 4 of the pulse generator.

A seventh resistive element or resistor R16 is electrically connected between the emitter electrode of pre-driver transistor Q7 and the base electrode of power transistor Q1. The capacitive element or capacitor C1 is electrically connected between the emitter of pre-driver transistor Q7 and the base of transistor Q1.

For an illustration of an exemplary working embodiment of the present invention, there is set forth hereinafter some typical components and voltages for the illustrated schematic circuit.

Diode D1 may be a 1N3494R. Diodes D2–D8 may each be a 1N2070.

Transistors Q1–Q6 may each be a 2N5239 transistor. Pre-drive transistor Q7 may be a 2N2405.

Resistors R2–R6 may each be a 22K ohm resistor. Resistor R7 may be an 8.2 ohm 5 watt resistor. Resistors R8–R12 may each be a 0.47 ohm resistor. Resistor R13 may be a 600 ohm 10 watt resistor. Resistor R14 may be a 15K ohm resistor. Resistor R15 may be a 39 ohm resistor. Resistor R16 may be a 150 ohm resistor.

Capacitor C1 may be a 0.05 microfarad capacitor.

A typical voltage supply to terminal 6 may be +80 volts. The voltage supply to the conductive workpiece 1 may vary between +80 volts and +160 volts.

An understanding of the operational functioning of the present invention can be facilitated by the following explanation.

An essential feature of the present invention resides in the individual diodes D2–D6 which are connected in series with the base electrode of the output transistors Q2–Q6, respectively, to prevent a massive failure and also to protect the individual transistors against second breakdown. The failure of transistor Q5, for example, will result in an open circuit emitter resistor R11, and the base, emitter and collector of transistor Q5 will approach the collector potential, e.g., +80 volts "OFF". This places a large reverse bias on diode D5 which prevents a blowout of resistor R7 and subsequent breakdown of transistors Q2, Q3, Q4, and Q6.

The presence of a high voltage due to a breakdown is detected at the protector circuit terminal 3, and such a detected signal is used to turn OFF the high voltage supply and to turn ON an operator warning light until repair or replacement of the malfunctioned or failed component has taken place.

It should be noted in connection with the particular embodiment for which components have been set forth above, that the value of the resistance for the emitter return resistors R15 and R7 in the pre-driver and driver circuits, and the base-coupling resistor R16 have been selected to improve the high frequency wave shape and to make the output duty cycle at high frequency follow more closely the multi-vibrator duty cycle.

Essentially, a vital feature of the present invention resides in a cascade circuit of protective diodes D2–D6 arranged in such a fashion that if one of the cascaded transistors fails, a complete malfunction of the entire apparatus is prevented. If the drive to the power transistors is increased, the amount of the collector current begins to become limited. This advantageous feature is attained depending, of course, on the other various circuit parameters. The circuit of the invention behaves as if the diodes were not in the circuit up to a certain point when increasing the drive to the power transistors, and then there appears a sharp reduction in the increase of collector current with the increase in drive. This appears to be a self-limiting advantage of the present invention. There appears to be a threshold where the diodes seem to show their influence, and this is reflected in the fact that circuits built in accordance with the principles of the present invention have manifested substantially no failure due to second breakdown.

A second breakdown phenomenon occurs in the presence of high current and fairly high voltage. Under such conditions the electronic control device is apt to rapidly break down like an avalanche process, which results in irreparable damage because the device is burned through at one of its junctions. In other words, if a single pulse should be applied to the transistor when the conditions at the transistor are at an elevated current and elevated voltage, such a single applied pulse would irreparably destroy the junction of the transistor.

The introduction of the diodes D2–D6 precludes failure by the second breakdown phenomenon. The exact mechanism for this extremely beneficial and advantageous result is not known with absolute certainty. However, it is theorized that the mechanism is as follows. When there is a tendency or conditions for the second breakdown phenomenon to occur, then the diode becomes biased in the reverse manner and thus cuts off the drive. This effectively eliminates the condition which produces the regenerative action, to prevent the breakdown.

In the particular embodiment of the present invention which is illustrated in the drawing, a fundamental feature of the invention resides in the concept or idea of sensing the conditions at the emitter electrodes, collecting the sensed information, and having the circuit make a judgment whether the collected sensed information constitutes a normal or abnormal situation. When an abnormal situation is sensed, the circuitry can automatically turn OFF the supplying voltages.

I claim:

1. In an apparatus for machining a conductive workpiece by passing electrical pulses between a tool electrode and said workpiece across an arc gap therebetween, wherein the improvement comprises:

a first electronic control device having a collector electrode, an emitter electrode and a control electrode;

a plurality of second electronic control devices each having a collector electrode, an emitter electrode and a control electrode;

said collector electrodes of said first and second electronic control devices being electrically connected together;

a first unidirectional electrical device electrically connected between said conductive workpiece and said collector electrodes of said first and second electronic control devices;

a first resistive network electrically connected between said tool electrode and said collector electrodes of said first and second electronic control devices;

first and second terminals electrically connected to said emitter electrode and said control electrode, respectively, of said first electronic control device;

said emitter electrodes of said plurality of second electronic control devices being electrically connected to said first terminal;

a plurality of second unidirectional electrical devices, each of said second unidirectional electrical devices being electrically connected to and associated with a respective one of said second electronic control devices in such a manner that said second unidirectional electrical device is electrically connected between said control electrode of its associated second electronic control device and said emitter electrode of said first electronic control device, pre-driver circuit means interposed between said first and second terminals and said first electronic control device, said pre-driver circuit including an additional electronic control device having an emitter electrode coupled to said control electrode of said first electronic control device through a parallel combination of a reactive element and a resistive element, said additional electronic control device having a control electrode coupled to said second terminal and an emitter electrode coupled to said first terminal;

a protector circuit electrically connected to said emitter electrodes of said second electronic control devices for detecting a malfunction of any one of said second electronic control devices; and said protector circuit including a plurality of first resistive elements each being electrically connected between a respective emitter electrode of said second electronic control devices and at least a third unidirectional electrical device.

2. The combination as set forth in claim 1, including:

a plurality of third resistive elements each of which is electrically connected between said first terminal and a respective emitter electrode of said second electronic control devices.

3. The combination as set forth in claim 1, wherein said unidirectional electrical devices comprise diodes and all said electronic control devices are transistors.

* * * * *

UNITED STATES PATENT OFFICE
CERTIFICATE OF CORRECTION

PATENT NO. : 3,878,437

DATED : April 15, 1975

INVENTOR(S) : Seymour Cuker

It is certified that error appears in the above-identified patent and that said Letters Patent are hereby corrected as shown below:

Assignment to Tarus Products, Inc.,
Hazel Park, Mich.

Signed and sealed this 1st day of July 1975.

(SEAL)
Attest:

RUTH C. MASON
Attesting Officer

C. MARSHALL DANN
Commissioner of Patents
and Trademarks